US012547176B2

(12) United States Patent
Gaud et al.

(10) Patent No.: US 12,547,176 B2
(45) Date of Patent: Feb. 10, 2026

(54) METHOD AND SYSTEM FOR OPTIMAL COVERAGE PATH PLANNING FOR AUTONOMOUS MOBILE DEVICES

(71) Applicants: Rapyuta Robotics Co., Ltd., Tokyo (JP); TAISEI CORPORATION, Tokyo (JP)

(72) Inventors: Ayush Kumar Gaud, Tokyo (JP); Shigekazu Matsuzaki, Tokyo (JP); Koji Nakatani, Tokyo (JP); Takafumi Kashimoto, Tokyo (JP)

(73) Assignees: Rapyuta Robotics Co., Ltd., Tokyo (JP); Taisei Corporation, Tokyo (JP)

( * ) Notice: Subject to any disclaimer, the term of this patent is extended or adjusted under 35 U.S.C. 154(b) by 618 days.

(21) Appl. No.: 17/966,932

(22) Filed: Oct. 17, 2022

(65) Prior Publication Data

US 2023/0147938 A1    May 11, 2023

Related U.S. Application Data

(63) Continuation-in-part of application No. 17/583,250, filed on Jan. 25, 2022.

(60) Provisional application No. 63/278,169, filed on Nov. 11, 2021.

(51) Int. Cl.
*G05D 1/00* (2024.01)

(52) U.S. Cl.
CPC ......... *G05D 1/0217* (2013.01); *G05D 1/0214* (2013.01); *G05D 1/0238* (2013.01)

(58) Field of Classification Search
CPC ............... G05D 1/0217; G05D 1/0214; G05D 1/0238; G05D 1/0246; G05D 1/0274; G05D 1/0291; G01C 21/20
USPC ....... 701/23, 25, 533, 28, 26, 532, 408, 301, 701/300, 2, 410, 469, 409, 428, 523, 446, 701/520; 700/245
See application file for complete search history.

(56) References Cited

U.S. PATENT DOCUMENTS

| | | | |
|---|---|---|---|
| 2017/0364076 A1* | 12/2017 | Keshmiri | G05B 19/41 |
| 2019/0258878 A1* | 8/2019 | Koivisto | G06V 10/46 |
| 2020/0377311 A1* | 12/2020 | Diankov | B65B 57/00 |
| 2022/0083074 A1* | 3/2022 | Ferrer | G05D 1/0253 |
| 2022/0187076 A1* | 6/2022 | Gonzalez Diaz | G06F 30/10 |

* cited by examiner

*Primary Examiner* — Anne Marie Antonucci
*Assistant Examiner* — Jodi Jones
(74) *Attorney, Agent, or Firm* — Trupti P. Joshi

(57) ABSTRACT

Embodiments of the present disclosure disclose a system and method for optimizing coverage path planning of robots. Data is received from sensors associated with robots in a region. The data is captured in a plurality of poses from a plurality of viewpoints in the region. A priority cost is assigned for each viewpoint based on: objects detected in the data and region of interest in the objects captured by the sensors in the viewpoint. Further, a set of optimal viewpoints are determined from the plurality of viewpoints using objective functions. The objective functions is based on the priority cost associated with each viewpoint and a coverage value for each corresponding viewpoint. The coverage value for a viewpoint indicates an area of the region captured by the sensors from the corresponding viewpoint. Thereafter, a coverage path is generated for the robots based at least on the set of optimal viewpoints.

20 Claims, 6 Drawing Sheets

METHOD AND SYSTEM FOR OPTIMAL COVERAGE PATH PLANNING FOR AUTONOMOUS MOBILE DEVICES

CROSS-REFERENCE TO RELATED APPLICATIONS

The present application is a continuation-in-part (CIP) of U.S. patent application Ser. No. 17/583,250, filed Jan. 25, 2022, which claims the benefit of priority to U.S. Provisional Application No. 63/278,169, filed Nov. 11, 2021, the contents of each of which are incorporated by reference herein in their entireties.

TECHNICAL FIELD

The present disclosure generally relates to coverage path planning, more particularly to optimal coverage path planning for autonomous mobile devices.

BACKGROUND

Coverage path planning includes exploring a region and in the process, identifying a set of viewpoints to visit which ensures complete coverage of the region. More specifically, the region is exhaustively analyzed to determine a best path encapsulating the set of viewpoints covering the region while avoiding possible obstacles. Such coverage path planning is integral to many robots deployed as household cleaning robots, demining robots, lawn mowers, agricultural automatic harvesters, storage and retrieval robots and the like.

Conventionally, the performance of the coverage path planning approach is determined based on optimality in coverage of the region. As such, viewpoint generation is considered critical in coverage path planning. Although, the viewpoint generation accounts for maximum coverage of the region, the viewpoints generated using traditional approaches are not optimal as observation quality of objects in the viewpoints are not factored. Moreover, traveling sales man problem (TSP) is used to generate a coverage path representing a set of admissible viewpoints that covers the region of interest for maximum coverage of the region of interest and obstacle avoidance but the coverage path is not optimized. This happens due to kinematic constraints of the robot in which abrupt transitions from one viewpoint to another viewpoint may consume additional time and energy.

In view of the above discussion, there is a need to optimize coverage path planning for autonomous mobile devices.

SUMMARY

In an embodiment, a method is disclosed. The method includes receiving, by a processor, data from one or more sensors associated with at least one robot in a region. The data is captured in a plurality of poses from a plurality of viewpoints in the region. The method includes assigning, by the processor, a priority cost for each viewpoint of the plurality of viewpoints based on at least: one or more objects detected in the data captured in a corresponding viewpoint and a region of interest in the one or more objects captured by the one or more sensors in the corresponding viewpoint. The method includes identifying, by the processor, a set of optimal viewpoints from the plurality of viewpoints using one or more objective functions. The one or more objective functions is based on at least the priority cost associated with each viewpoint of the plurality of viewpoints and a coverage value for each corresponding viewpoint. The coverage value for a viewpoint indicates an area of the region captured by the one or more sensors from the corresponding viewpoint. The method includes generating, by the processor, a coverage path for the at least one robot based at least on the set of optimal viewpoints. The at least one robot is configured to traverse the coverage path.

In another embodiment, a system is disclosed. The system includes a memory and a processor. The memory is configured to store instructions and the processor is configured to execute the instructions stored in the memory and thereby cause the system to perform the method. The system is caused to receive data from one or more sensors associated with at least one robot in a region. The data is captured in a plurality of poses from a plurality of viewpoints in the region. The system is caused to assign a priority cost for each viewpoint of the plurality of viewpoints based on at least: one or more objects detected in the data captured in a corresponding viewpoint and a region of interest in the one or more objects captured by the one or more sensors in the corresponding viewpoint. The system is caused to identify a set of optimal viewpoints from the plurality of viewpoints using one or more objective functions. The one or more objective functions is based on at least the priority cost associated with each viewpoint of the plurality of viewpoints and a coverage value for each corresponding viewpoint. The coverage value for a viewpoint indicates an area of the region captured by the one or more sensors from the corresponding viewpoint. The system is caused to generate a coverage path for the at least one robot based at least on the set of optimal viewpoints. The at least one robot is configured to traverse the coverage path.

In yet another embodiment, a non-transitory computer-readable medium is disclosed. The non-transitory computer-readable medium stores instructions for optimizing coverage path planning of autonomous mobile devices. The instructions when executed by a processor cause a system to perform a method. The method includes receiving, by a system, data from one or more sensors associated with at least one robot in a region. The data is captured in a plurality of poses from a plurality of viewpoints in the region. The method includes assigning, by the system, a priority cost for each viewpoint of the plurality of viewpoints based on at least: one or more objects detected in the data captured in a corresponding viewpoint and a region of interest in the one or more objects captured by the one or more sensors in the corresponding viewpoint. The method includes identifying, by the system, a set of optimal viewpoints from the plurality of viewpoints using one or more objective functions. The one or more objective functions is based on at least the priority cost associated with each viewpoint of the plurality of viewpoints and a coverage value for each corresponding viewpoint. The coverage value for a viewpoint indicates an area of the region captured by the one or more sensors from the corresponding viewpoint. The method includes generating, by the system, a coverage path for the at least one robot based at least on the set of optimal viewpoints. The at least one robot is configured to traverse the coverage path.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. The same numbers are used throughout the figures to reference like features and components. Some embodiments of device and/or methods in accordance with embodiments of the present subject matter are now described, by way of example only, and with reference to the accompanying figures, in which.

Figure 1:
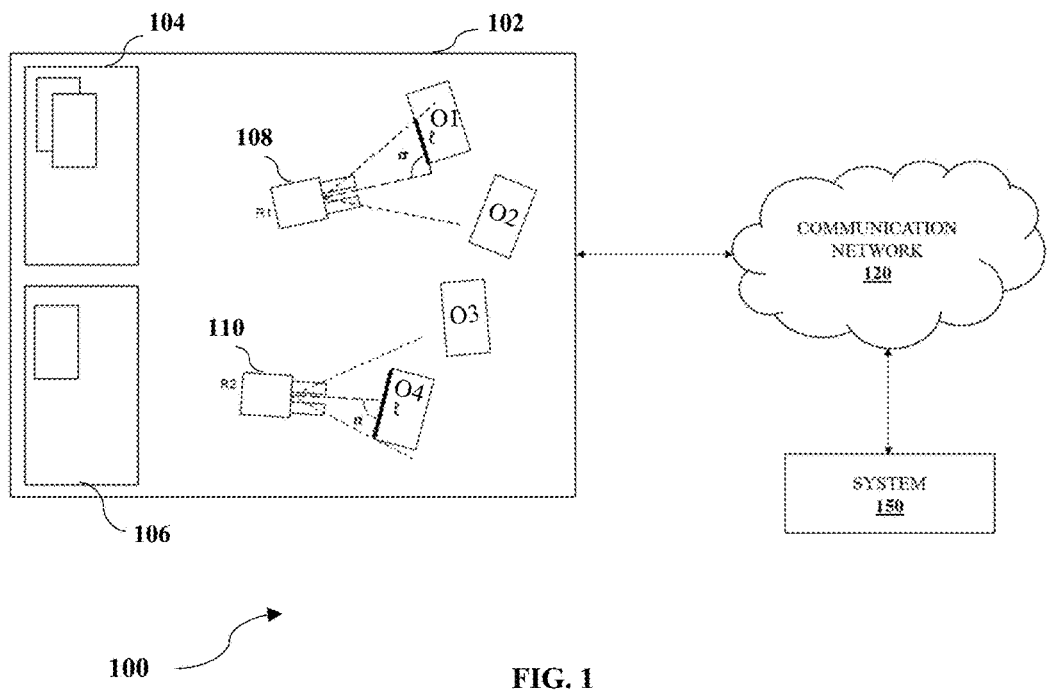
FIG. 1 illustrates an environment depicting autonomous storage and retrieval of objects in a warehouse by autonomous mobile devices, in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration". Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a device or system or apparatus proceeded by "comprises . . . a" does not, without more constraints, preclude the existence of other elements or additional elements in the device or system or apparatus.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The term 'pose' as used herein refers to a robot assuming a specific position in a cell. More specifically, the robot is positioned in a particular direction/orientation to capture images of surroundings. For example, a robot in a cell rotates 90° to assume different poses for capturing different images using one or more sensors of the robot. In one example, the robot occupies a position in a cell $C_1$ to assume a pose $P_1$, then the robot rotates in the same position by 90° to assume a pose $P_2$ in the cell $C_1$. Further, the robot may rotate in the same position by another 90° to assume a pose $P_3$ in the cell $C_1$. As such, rotation by 90° in the position of the cell $C_1$ ensures the robot assumes poses $P_1$, $P_2$, $P_3$ and $P_4$ in the cell $C_1$ to capture a plurality of images of the region.

Further, the term 'viewpoint' as used herein refers to position and orientation/direction of the robot at different locations within the region for evaluating the environment and surrounding. More specifically, viewpoints correspond to specific perspective views from different positions or cells in the region. For example, a robot moves between different cells to capture images at different perspectives using the one or more sensors. In an example, a robot assumes a pose in a cell $C_1$ with a perspective view (i.e., orientation at an angle) to capture one or more images of an object and then moves to assume a different pose on a cell $C_2$ with a different perspective view to capture one or more images of the object from a different viewing angle.

FIG. 1 illustrates an example representation of an environment 100 depicting autonomous storage and retrieval of objects by autonomous mobile devices, in accordance with some embodiments of the present disclosure. The environment 100 exemplarily depicts a warehouse 102 where a plurality of objects (shown as $O_1$, $O_2$, $O_3$ and $O_4$ in FIG. 1) are stored in specific locations of the warehouse 102. It shall be noted that although the environment 100 is explained with reference to the warehouse 102 for exemplary purposes, the environment 100 may be any other scenario where coverage path planning may be implemented. Some examples of the environment in which coverage path planning for one or more autonomous mobile devices may be performed include, but not limited to, search and rescue, lawn mowing, demining, agricultural harvesting, and the like.

The warehouse 102 includes one or more autonomous mobile devices such as, the autonomous mobile devices 108 and 110 (hereinafter referred to as robots 108, 110), for autonomous storage and retrieval of objects. The robots 108, 110 comprise one or more sensors for capturing data in a plurality of poses from a plurality of viewpoints. Typically, the one or more sensors of the robots 108, 110 collect data from the warehouse 102 for analysis and manipulation of the objects in the warehouse 102. Some examples of the one or more sensors of the robots that collate data related to the objects in the warehouse 102 include, but not limited to, proximity sensors (such as, infrared sensors, ultrasound distance sensor), image sensors (RGB sensors), Radio Detection And Ranging (RADAR) sensor, Light detection And Ranging (LIDAR) sensor, and the like for detecting the objects or identifying characteristics of objects and localizing position of the detected objects. In an embodiment, the data includes at least one of: radar images, RGB images, lidar images, and infrared images. It shall be noted that only sensors of the robots 108, 110 pertinent to the present disclosure for coverage path planning are disclosed and the robots 108, 110 may include other sensors such as, force sensors, light sensors, temperature sensors, touch sensors, sound sensors and the like for detecting environmental factors and influencing their behavior may be integrated within the robots 108, 110.

As such, when the objects $O_1$, $O_2$, $O_3$ and $O_4$ are stored in the warehouse 102, coverage path planning may be performed for the robots 108 and 110 based on the data to determine a set of feasible paths encapsulating a set of viewpoints which the robots 108 and 110 must visit. As described earlier, capturing the data from the viewpoint ensures complete scan or survey of the warehouse 102 and the objects $O_1$, $O_2$, $O_3$ and $O_4$ of interest. In an example scenario, the objects $O_1$, $O_2$, $O_3$ and $O_4$ need to be identified, categorized and placed in appropriate storage locations, for example, objects $O_1$, and $O_3$ need to be placed at location 104 and the objects $O_2$ and $O_4$ need to be picked and dropped at location 106 of the warehouse 102.

Various embodiments of the present disclosure disclose a system 150 implementing a method for optimal coverage path planning of robots in the warehouse 100. Accordingly, data from one or more sensors of the autonomous mobile device are processed to detect objects and associated dimensional attributes in a field of view of the one or more sensors of the robot which may be used to determine a priority cost associated with each viewpoint of a plurality of viewpoints sampled by the robot. Thereafter, an optimal set of viewpoints are determined for each robot 108, 110 based on the priority cost determined for each viewpoint. Further, the system 150 is configured to determine an optimal coverage path based on the optimal set of viewpoints. In general, the system 150 performs a data driven analysis of the set of optimal viewpoints to identify a traversal order of the optimal set of viewpoints for each robot to maximize information gain. Moreover, smooth transitions and traversal of the robot from one optimal viewpoint to another viewpoint is performed to optimize time consumed by abrupt transitions due to kinematics constraints of the robots. Further, the system 150 is configured to identify obstruction constraints from the received data to determine an optimal pick up order for moving the objects from source to destination location.

It is understood that the robots 108, 110 may be in operative communication with the system 150 and among the robots 108, 110 via a communication network 120. The robots 108, 110 may connect to the communication network 120 using a wired network, a wireless network, or a combination of wired and wireless networks. Some non-limiting examples of the wired networks may include the Ethernet, the Local Area Network (LAN), a fiber-optic network, and the like. Some non-limiting examples of the wireless networks may include the Wireless LAN (WLAN), cellular networks, Bluetooth or ZigBee networks, and the like. An example of the communication network is the Internet. The system 150 for optimal coverage path planning is explained in detail next with reference to FIG. 2.

Figure 2:
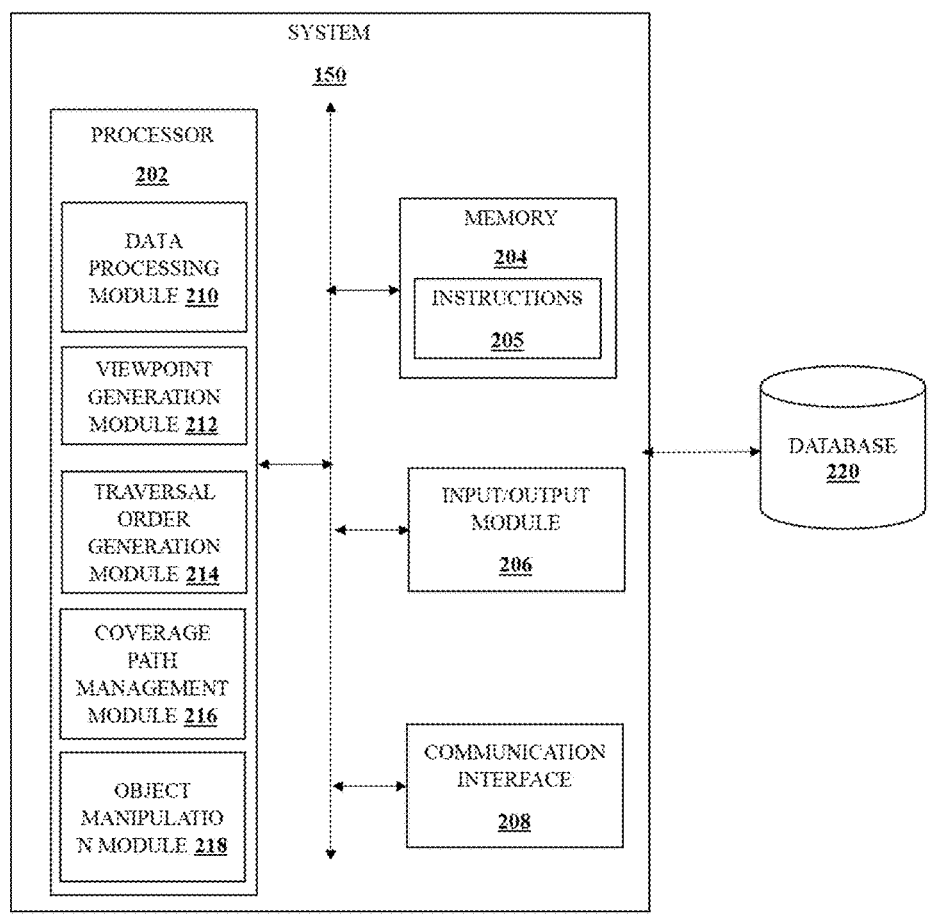
FIG. 2 illustrates a system for optimizing coverage path planning of autonomous mobile devices, in accordance with an embodiment of the present disclosure.

FIG. 2 illustrates the system 150 for optimizing coverage path, in accordance with an embodiment of the present disclosure. The term 'optimizing coverage path' as used herein refers to multi-fold optimization in which optimal viewpoints that maximize information gain about the objects in a surrounding region of the robot are identified and a traversal order of the optimal viewpoints are identified such that viewpoints with maximum information are traversed first. Such optimization of coverage path reduces time taken to collate data from a surrounding region, for example, the warehouse 102 for performing tasks in an optimal manner.

In an embodiment, the system 150 is a centralized controller managing operations of an environment, such as autonomous storage and retrieval within the warehouse 102. In another embodiment, the system 150 may be a remote server capable of receiving information related to the robots operating in the environment for generating optimized coverage path. In yet another embodiment, the system 150 may be embodied within a robot, for example, the robot 108 and capable of performing one or more of the operations described herein.

The system 150 is depicted to include a processor 202, a memory 204, an Input/Output module 206, and a communication interface 208. It shall be noted that, in some embodiments, the system 150 may include more or fewer components than those depicted herein. The various components of the system 150 may be implemented using hardware, software, firmware or any combinations thereof. Further, the various components of the system 150 may be operably coupled with each other. More specifically, various components of the system 150 may be capable of communicating with each other using communication channel media (such as buses, interconnects, etc.). It is also noted that one or more components of the system 150 may be implemented in a single server or a plurality of servers, which are remotely placed from each other.

In one embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including, a microcontroller unit (MCU), a hardware accelerator, a special-purpose computer chip, or the like. The processor 202 includes a data processing module 210, a viewpoint generation module 212, a traversal order generation module 214, a coverage path management module 216 and an object manipulation module 218 which are explained in detail later.

In one embodiment, the memory 204 is capable of storing machine executable instructions, referred to herein as instructions 205. In an embodiment, the processor 202 is embodied as an executor of software instructions. As such, the processor 202 is capable of executing the instructions 205 stored in the memory 204 to perform one or more operations described herein. The memory 204 can be any type of storage accessible to the processor 202 to perform respective functionalities, as will be explained in detail with reference to FIGS. 2 to 5. For example, the memory 204 may include one or more volatile or non-volatile memories, or a combination thereof. For example, the memory 204 may be embodied as semiconductor memories, such as flash memory, mask ROM, PROM (programmable ROM), EPROM (erasable PROM), RAM (random access memory), etc. and the like.

In an embodiment, the processor 202 is configured to execute the instructions 205 for: (1) generating one or more data prediction models, (2) assigning a priority cost for each viewpoint of the plurality of viewpoints, (3) constructing a visibility matrix based on the coverage value associated each viewpoint of the plurality of viewpoints, (4) identifying a set of optimal viewpoints from the plurality of viewpoints using one or more objective functions, (5) determining a traversal cost between each pair of optimal viewpoints from the set of optimal viewpoints, (6) identifying a traversal order for the at least one robot to visit the set of optimal viewpoints. During traversal of the coverage path, the processor 202 is configured to execute the instructions 205 for: (1) generating a smooth transition between a pair of optimal viewpoints, (2) initiating a replanning of the coverage path based on a control signal received from the at least one robot, (3) updating the coverage path for the at least one robot, (4) determining obstruction constraints in relation to each object, (5) generating a pickup order for moving each object from a source location to a destination location in the region based on the obstruction constraints, (6) reevaluating obstruction constraints after the at least one robot moves each object, and (7) updating the pickup order for the at least one robot based on the reevaluated obstruction constraints.

In an embodiment, the I/O module 206 may include mechanisms configured to receive inputs from and provide outputs to peripheral devices such as, robots exploring a region, robots traversing coverage paths for random picking and moving objects, and/or an operator of the system 150. The term 'operator of the system 150' as used herein may refer to one or more individuals, whether directly or indirectly, associated with managing the warehouse 102. To enable reception of inputs and provide outputs to the system 150, the I/O module 206 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a display such as a light emitting diode display, a thin-film transistor (TFT) display, a liquid crystal display, an active-matrix organic light-emitting diode (AMOLED) display, a microphone, a speaker, a ringer, and the like.

The system 150 is depicted to be in operative communication with a database 220. In one embodiment, the database 220 is configured to store one or more AI models for detecting one or more objects from the data. In an example, different neural network models may be stored for detecting different objects, such as, crates, pallets, canisters, humans, obstacles (e.g., walls, trolleys. etc.), or other robots and the like. Further, the database 220 may also store details related to objects detected in the environment, for example, object characteristics (e.g., dimensions, texture, location, position, orientation, etc.). In an embodiment, the database 220 also maintains a table indicating obstruction constraints of various objects as updated and shared by the robot.

The database 220 may include multiple storage units such as hard disks and/or solid-state disks in a redundant array of inexpensive disks (RAID) configuration. In some embodiments, the database 220 may include a storage area network (SAN) and/or a network attached storage (NAS) system. In one embodiment, the database 220 may correspond to a distributed storage system, wherein individual databases are configured to store custom information, such as routing policies, optimal viewpoint selection policies, robot specifications, obstruction constraints of each robot, etc.

In some embodiments, the database 220 is integrated within the system 150. For example, the system 150 may include one or more hard disk drives as the database 220. In other embodiments, the database 220 is external to the system 150 and may be accessed by the system 150 using a storage interface (not shown in FIG. 2). The storage interface is any component capable of providing the processor 202 with access to the database 220. The storage interface may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 202 with access to the database 220.

In an embodiment, the communication interface 208 may include mechanisms configured to communicate with other entities in the environment 100. In other words, the communication interface 208 is configured to collate data from at least one robot for processing by the processor 202. For example, the communication interface 208 is configured to receive data from one or more sensors associated with the at least one robot in a region. The region may be a region of interest in an environment, for example, a specific area in a warehouse where objects are typically offloaded and placed in which the robots explore to determine object characteristics. In an embodiment, the region R is represented on a grid and as such, the region is represented as a plurality of cells $C_1, C_2, \ldots, C_n$. An example representation of the region on a grid and a robot exploring the region is explained with reference to FIG. 3.

Figure 3:
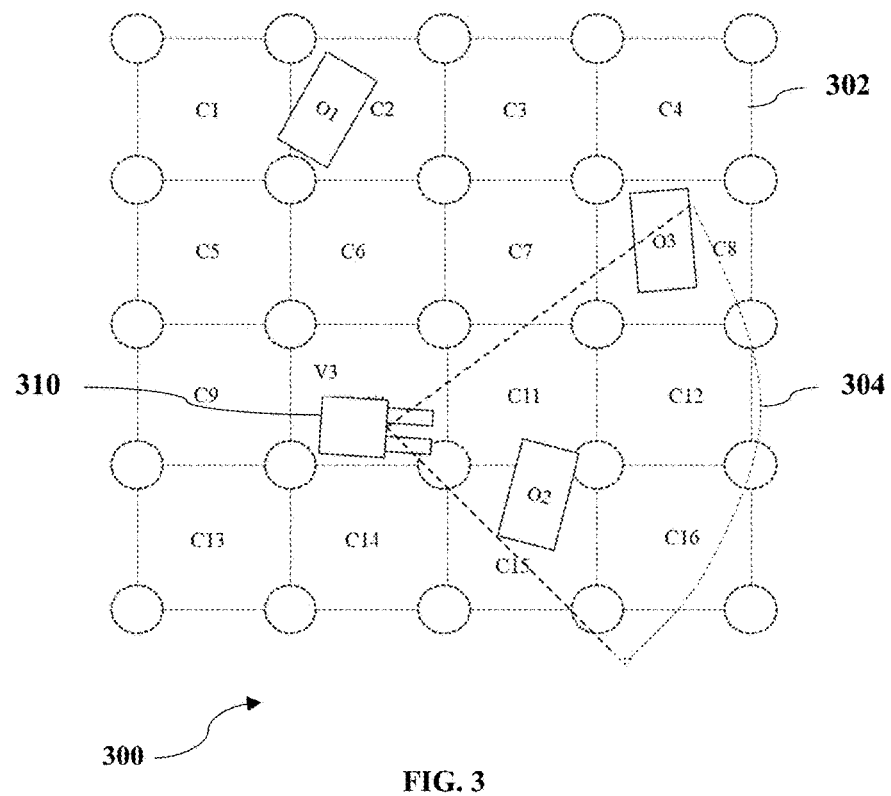
FIG. 3 illustrates a graphical representation of an autonomous mobile device exploring a region, in accordance with an embodiment of the present disclosure.

Referring now to FIG. 3, a schematic representation of a robot 310 exploring a region 300 is illustrated in accordance with an embodiment of the present disclosure. As shown in FIG. 3, the region 300 is represented as a grid 302 for exploration by a robot 310. The grid 302 is an imaginary representation of the region 300 and as such, the grid 302 segregates the region 300 into a plurality of cells. It shall be noted that the cells of the grid 302 are segregated to form squares of equal/uniform sizes for exemplary purposes and the cells may indeed be segregated into different shapes and sizes, for example, triangular cells, hexagonal cells, diamond cells, pentagonal calls and like of equal or unequal sizes. Moreover, a single robot 310 is shown for exemplary purposes and more than one robot may be simultaneously deployed in the region 300 for exploration, random picking and dropping of objects.

The robot 310 explores the region 300 to capture data related to the region 300 using one or more sensors associated with the robot 310. Some examples of the one or more sensors include, but not limited to, proximity sensors, thermal sensors, ultrasound sensors, imaging sensors, infrared sensors, radar sensors, lidar sensors and the like to collate data related to the region 300. As such, data received from the one or more sensors include radar images, RGB images, lidar images, infrared images, ultrasound images, and the like. More specifically, the one or more sensors capture data related to objects in the region, for example, crates, pallets, boxes and the like storing goods/products. In one example, the robot may capture images $I_1, I_2, I_3, \ldots I_n$ from a plurality of viewpoints $V_1, V_2, \ldots, V_m$. For example, images $I_1, I_2$ are captured from viewpoint $V_1$ representing pose $P_1$ in a cell $C_4$, image $I_3$ is captured from viewpoint $V_2$ representing pose $P_2$ from a cell $C_8$, images $I_4$, $I_5$, $I_6$ captured from viewpoint $V_3$ representing pose $P_1$ from a cell $C_{12}$, and so on. As an example, the images $I_1$, $I_2$ capture an object $O_1$, image $I_3$ captures no objects in the region 300, each of the images $I_4$, $I_5$ partly capture an object $O_2$ and image $I_6$ captures an object $O_3$. It shall be noted that the robot 310 has no information of the region 300 and as such, randomly samples different cells on the grid 302 representing the region 300.

Each sensor of the one or more sensors have a field of view, and images captured from each viewpoint with the sensor field of view may be processed to determine coverage value for corresponding viewpoint. More specifically, the coverage value for a viewpoint indicates an area of the region 300 in which one or more cells are visible from the viewpoint. The one or more cells are determined by ray tracing a field of view (see, ray 304) of the one or more sensors from the corresponding viewpoint. As the region 300 is represented on a grid 302, the coverage value for a viewpoint is represented in terms of cell indices of one or more cells of the plurality of cells in the region captured by the one or more sensors from the corresponding viewpoint. In one example, the robot 310 at the cell $C_{10}$ captures the image $I_4$ from the viewpoint $V_3$. Accordingly, the image $I_4$ may capture cells $C_{10}$, $C_{14}$, $C_{11}$, $C_{15}$, $C_7$, $C_8$, $C_{12}$, $C_{16}$ and as such coverage value of cells $C_{10}$, $C_{14}$, $C_{11}$, $C_{15}$, $C_7$, $C_8$, $C_{12}$, $C_{16}$ may be determined by processing the image $I_4$. In an embodiment, the coverage value is a probability value of viewing a cell on the grid 302 from a specific viewpoint. Accordingly, the image $I_4$ may be processed to determine coverage value of cells $C_{10}$, $C_{14}$, $C_{11}$, $C_{15}$, $C_7$, $C_8$, $C_{12}$, $C_{16}$. For example, coverage value of cells $C_{10}$, $C_{14}$, $C_{11}$, $C_{15}$, $C_7$, $C_8$, $C_{12}$, $C_{16}$ may be 0.3, 0.05, 0.72, 0.88, 0.48, 0.97 and 0.44, respectively. These coverage values may be determined based on visibility levels of each cell and/or quality of observation of objects in each of the cells in the field of view of the one or more sensors of the robot 310.

In an embodiment, every image captured or every observation made by the one or more sensors of the robot 310 is used to update the probability value of capturing each cell in a global map of the region 300 and as such, the coverage value of all cells in the region 300 is improved with different observations made at the plurality of viewpoints (i.e., different orientation and poses/positions) of the robot 310. It shall be noted that when more than one robot is deployed in the region 300, the coverage values obtained from a plurality of viewpoints of each of those robots may be used to update the global map dynamically, thereby improving the quality of observations. Moreover, the process of receiving continuous sensor data from different viewpoints and updating the global map ensures maximum quality of the observations of objects from each viewpoint. Further, time consumed in exploring the region 300 may be drastically reduced when a plurality of robots coordinate and operate together. Such data captured by the one or more sensors of the robot 310 may be received by the communication interface 208 and forwarded to the processor 202.

Referring back to FIG. 2, the data received from the one or more sensors of the at least one robot is forwarded to the data processing module 210 of the processor 202. The data processing module 210 in conjunction with the instructions 205 stored in the memory 204 is configured to process the data for use by other modules of the processor 202 as will be described hereinafter. More specifically, the data is continuously received from the at least one robot in relation to the region explored and the data processing module 210 is configured to: (1) detect one or more objects in the data captured in a viewpoint, (2) determine coverage value of each cell on the grid for each viewpoint based on the data, (3) dynamically update the global map based on the coverage value at each viewpoint, (4) determine object characteristics of objects in the region based on the data, and (5) extract information related to region of interest in the one or more objects.

The data processing module 210 is configured to detect one or more objects from the data captured by the one or more sensors of each robot in a viewpoint. More specifically, the images captured by the one or more sensors of the robot are processed to identify one or more objects. For example, an object $O_5$ (e.g., pallet) is positioned in the region of a warehouse and an image $I_2$ captures the object $O_5$ from a viewpoint $V_3$. As such, the image $I_2$ is processed to detect the object $O_5$ partly or in whole from the image $I_2$. In an embodiment, the data processing module 210 utilizes artificial intelligence (AI) based models, for example, machine learning model and deep neural networks (e.g., Convolutional neural network, pyramid network, etc.) for detecting objects from the images captured in a viewpoint. Some examples of the objects may include, but not limited to, crates, pallets, boxes, barrels, boxes, containers, canister, packages, and the like.

As already explained, the coverage value of each cell on the grid for each viewpoint may be determined by processing the images captured from the corresponding viewpoint. Moreover, the global map of the region and dynamic adaptation of the global map based on the coverage value determined at each viewpoint has been explained with reference to FIG. 3. In an embodiment, the images captured at each viewpoint are processed to extract information related to region of interest in the one or more objects. More specifically, regions of the objects that provide maximum information which may aid in identification, detection or manipulation of objects in the environment by the at least one robot are identified from the data. In an embodiment, a region of interest in the one or more objects captured by the one or more sensors corresponds to at least one of: a length of each object of the one or more objects, a width of each object of the one or more objects, a breadth of each object of the one or more objects, an area of each object of the one or more objects and volume of each object of the one or more objects. More specifically, dimensional attributes of each object may be determined by the data processing module 210 from the data (i.e., images captured in that viewpoint). For example, an imaging sensor captures a length 'l' of front face of an object (i.e., a line segment inside the field of view of the sensor) and an angle α between the sensor center of axis and the line segment as shown in FIG. 1. In other use cases, length 'l' can be replaced with a similar metric, for example, area covered by the region of interest of the object. In such a scenario, the region of interest can be a bounding box of the object of interest or it could be the pixels in a depth map within some threshold distance. For example, if the at least one robot has to identify a specific vehicle in an unstructured parking lot for maintenance works, given the registration number of the vehicle, the region of interest corresponds to the license plate/registration plate of the vehicle. As such, the region of interest may be determined based on a heading angle and an area covered by the license plate in the sensor field of view (FoV). Further, the normalized area may be determined as a ratio of the area of the region of interest and a total area of the image plane.

In an embodiment, the data processing module 210 is configured to determine object characteristics of each object in the region based on the data. Some examples of object characteristics include, but not limited to, size, shape, color, texture and the like. These object characteristics may be utilized by the object manipulation module 218 to identify and classify the object. More specifically, the object characteristics may be utilized to identify a location in the warehouse where the object has to be placed. In one example, objects (for example, crates) may be placed in different racks/shelves or locations of the warehouse based on the color of the pallet. As such, object characteristic of color may be used to identify the location at which the pallet needs to be moved to by the robot. Moreover, the object characteristics may be used to identify obstruction constraints as will be explained in detail later. Further, the data processing module 210 may also share the object characteristics with the at least one robot via the communication interface 208. The at least one robot may manipulate the object based on the object characteristics for picking and/or moving the object to a designated location. In an embodiment, information related to one or more objects detected in a viewpoint and a region of interest in the one or more objects in the corresponding viewpoint are forwarded to the viewpoint generation module 212.

The viewpoint generation module 212 in conjunction with the instructions 205 stored in the memory 204 is configured to determine a set of optimal viewpoints from the plurality of viewpoints that were sampled. The set of optimal viewpoints ensures complete coverage of the region whilst maximizing information gain related to objects in the region when the at least one robot visits the set of optimal viewpoints. In other words, the set of optimal viewpoints optimally cover the maximum area of the region possible which provides maximum information of the region. Accordingly, the viewpoint generation module 212 is configured to assign a priority cost for each viewpoint of the plurality of viewpoints. The priority cost is a measure indicating amount of information related to objects in a viewpoint and quality of observation of the objects in that viewpoint.

As such, the priority cost for each viewpoint is based on at least: one or more objects detected in the data captured in a corresponding viewpoint and a region of interest in the one or more objects captured in the corresponding viewpoint. In general, the objective in determining priority cost in such cases is to generate viewpoints that maximize information gain of the region. As such, every sampled viewpoint is assigned a priority cost based on quality of observation by the one or more sensors of the at least one robot. In an example, if the length of the front face of the object is determined from data associated with a viewpoint by the data processing module 210, then the priority cost for that viewpoint is based on the length 'l' of the front face of the object (i.e., line segment inside the field of view of the imaging sensor) and $\alpha$ is the angle between the sensor's center of axis and the line segment. In general, the priority cost P is proportional to maximizing projection such that line segments normal to the sensor of the robot will have higher costs than line segments at other angles. In other words, viewpoints with higher priority costs more likely help in getting a better estimate of the objects in the region that are intended to be manipulated (for example, picked and moved to another location). An example of determining priority cost for a viewpoint $V_i$ when length 'l' of the front face of the object and an angle $\alpha$ between the sensor's center of axis and the line segment 'l' is received from the data processing module 210 is as shown below by Equation (1).

$$\text{priority cost}(V_i) = \min(l * \sin\alpha, \text{cost}_{min}) \qquad \text{Equation (1)}$$

Figure 4A:
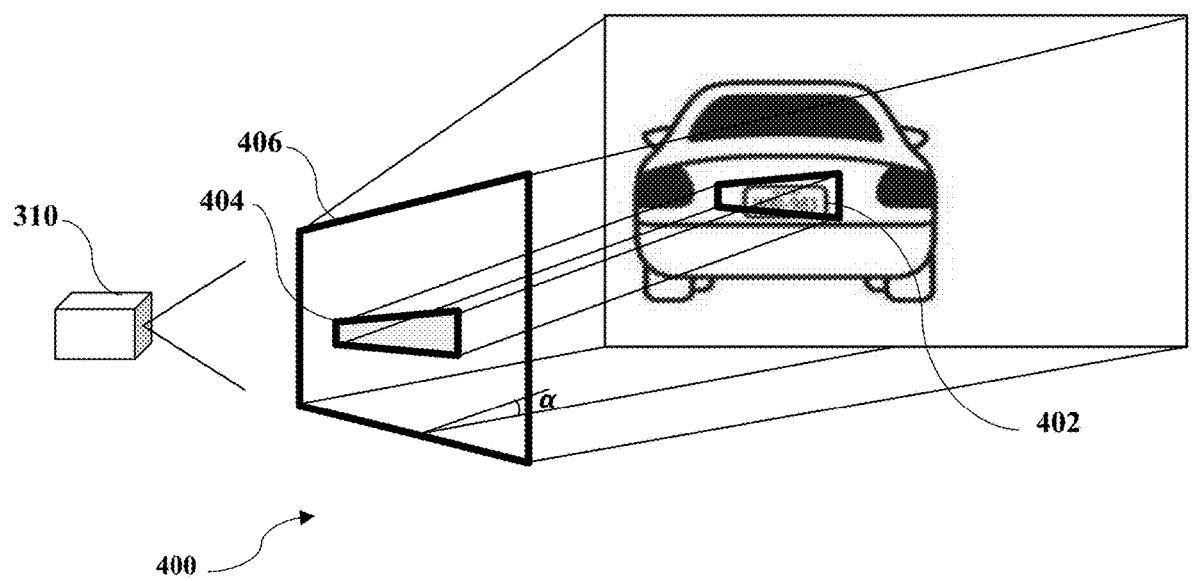
FIG. 4A is a schematic illustration for determining normalized area of a region of interest in an object, in accordance with an embodiment of the present disclosure.

In another embodiment, when area of an object is a region of interest of the object as shown in FIG. 4A, the priority cost associated with each viewpoint is determined based on Equation (2) shown below. For example, if identifying license plates of vehicles parked in a unstructured parking lot is the objective, then a priority cost is assigned based on heading angle $\alpha$ and area 404 covered by the license plate 402 in the sensor field of view (FoV) of the robot 310. Such assignment of priority cost gives precedence to viewpoints that increase information gain. As shown in Equation (2), the normalized area is a ratio of the area of the region of interest 404 and a total area of the image plane 406.

$$\text{priority cost}(V_i) = \min(\text{NormalizedArea}_{occupied} * \cos\alpha, \text{cost}_{min}) \qquad \text{Equation (2)}$$

Figure 4B:
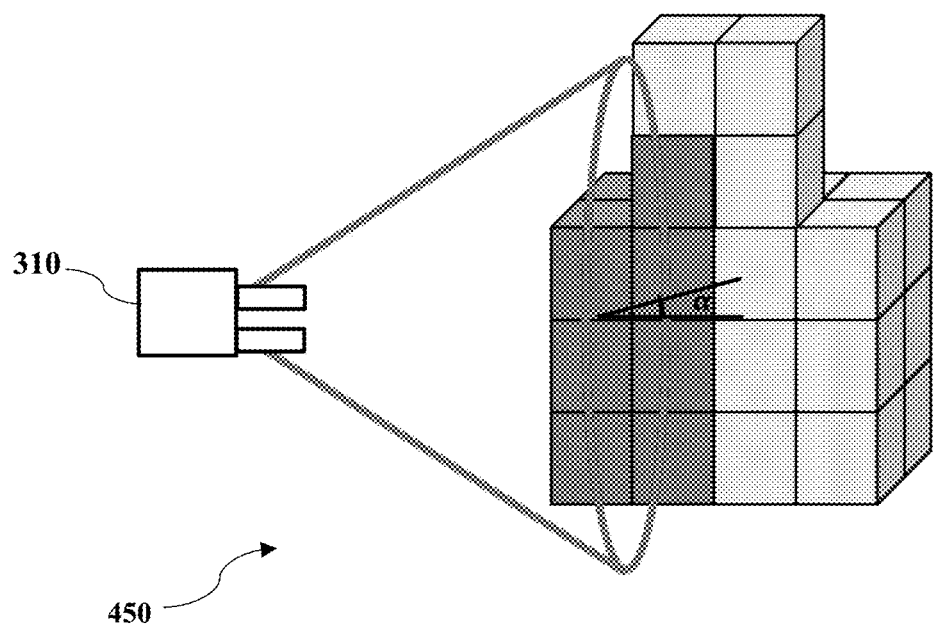
FIG. 4B is a schematic illustration for determining normalized volume of a region of interest in an object, in accordance with an embodiment of the present disclosure.

In another embodiment, normalized volume may be used to determine the priority cost $P_i$ of each viewpoint $V_i$ of the plurality of viewpoints $V_1, V_2, \ldots, V_m$. As shown in FIG. 4B, $\alpha$ is the mean angle to surface normals to discretized cells and this combined with swept volumetric intersection will be used to estimate the priority cost $P_i$ associated with the viewpoint. Thereafter, the normalized volume is determined as the ratio of the volume of cells inside the Field of View (FoV) and the total volume of the frustum.

$$\text{priority cost}(V_i) = \min(\text{NormalizedVolume}_{intersection} * \cos(\alpha_{mean}), \text{cost}_{min}) \qquad \text{Equation (3)}$$

After a priority cost is assigned for each viewpoint of the plurality of viewpoints, the priority costs associated with the plurality of viewpoints are normalized. As such, a maximum priority cost $P_{max}$ associated with a viewpoint is determined from the priority costs associated with the plurality of viewpoints $V_1, V_2, \ldots, V_m$. The priority costs $P_1, P_2, \ldots, P_m$ of the plurality of viewpoints $V_1, V_2, \ldots, V_m$ is divided by a maximum priority cost maximum priority cost $P_{max}$ such that the maximum priority cost of any viewpoint is one.

In an embodiment, the viewpoint generation module 212 is configured to identify the set of optimal viewpoints $v_1, v_2, \ldots, v_x$ (where, $v_x$ is a subset of $V_i$) from the plurality of viewpoints $V_1, V_2, \ldots, V_m$ using one or more objective functions. The one or more objective functions is based on at least the priority cost $P_1, P_2, \ldots, P_m$ associated with each viewpoint of the plurality of viewpoints $V_1, V_2, \ldots, V_m$ and a coverage value $C_i$ for each corresponding viewpoint. As already explained, the coverage value for a viewpoint indicates an area of the region captured by the one or more sensors from the corresponding viewpoint. For example, coverage value $CV_2$ for a viewpoint $V_2$ indicates cell indices of cells on the grid (e.g., cells $c_{12}, c_{22}, c_{23}, c_{24}, c_{32}, c_{34}, c_{35}, c_{36}$) that are covered by the sensors of the robot in that viewpoint $V_2$.

In an embodiment, the coverage values for each viewpoint may be represented as a visibility matrix M. More specifically, rows of the visibility matrix M represent cell indices $(c_1, c_2, \ldots, c_k)$ in the grid and columns represent the plurality of viewpoints $V_1, V_2, \ldots, V_m$. For each candidate viewpoint, all cells that are visible from the viewpoint are determined using ray tracing. As such, the probability value for each cell in the field of view of the sensors of the robot are updated in the visibility matrix M. It shall be noted that the range and angle swept by the ray of the sensor is determined based on properties of the sensor used by the robot.

An example of the objective function based on the priority cost associated with each viewpoint, the visibility matrix M including coverage value at the plurality of viewpoints and at least one threshold value is shown below in Equation (4).

$$\min(WoC)'(1-P):M \odot C \gtrless \text{threshold } T_1, 0 \lesssim C \lesssim 1 \quad \text{Equation (4)}$$

where W is the convex relaxation weight that is iteratively updated

M is the visibility matrix that is computed based on the cells that are swept by the FoV (field of view) of the sensor P is the priority cost associated with each viewpoint of the plurality of viewpoints coverage value C assumes non-binary values based on the threshold $T_1$ The objective function in Equation (4) is solved using a relaxed linear program for reducing the size of the NP-hard minimization problem to obtain a reduced set of candidate viewpoints from which all cells of the grid, such as, cells of the grid 302 (see, FIG. 3), would be visible. More specifically, solving the objective function of Equation (4) using the relaxed linear program extracts all non-zero candidate viewpoints of the plurality of viewpoints. Initially, all convex relaxation weights are set to 1 and iterations are performed with updated convex relaxation weight W till a terminal condition of sparsity if reached. After this iterative optimization, a subset of viewpoints are selected as candidate viewpoints by discarding all elements with zero coverage value C. In an embodiment, these candidate viewpoints constitute a 'set of optimal viewpoints'. In another embodiment, these candidate viewpoints may be further analyzed to generate the set of optimal viewpoints using a relaxed integer program. More specifically, the subset of viewpoints (i.e., candidate viewpoints) are used to perform a final round of optimization with C as binary variable as shown by Equation (5) below:

$$\min C'(1-P):M \odot C \gtrless \text{threshold } T_2, \forall C \in \{0,1\} \quad \text{Equation (5)}$$

where coverage value C assumes binary values based on the threshold $T_2$

The threshold $T_2$ is used to convert the coverage values into binary values. In general, reduced visibility matrix $M_R$ is generated based on the candidate viewpoints obtained after using the objective function in equation (5) and an objective function is used to determine min C' based on the threshold $T_2$. The objective function of Equation (5) uses relaxed integer program to determine the set of optimal viewpoints from the candidate viewpoints (candidate viewpoints determined using Equation (4)). After optimization, candidate viewpoints with non-zero coverage value C constitute the set of optimal viewpoints $v_x$ that ensure visibility of all the cells with maximum information of objects based on the associated priority costs. An example of the set of optimal viewpoints determined from a plurality of viewpoints is shown and explained with reference to FIG. 5A. As such, the set of optimal viewpoints optimally cover a maximum area of the region and capture maximum information related to objects in the region that needs to be manipulated by the at least one robot. The set of optimal viewpoints are provided to the traversal order generation module 214.

The traversal order generation module 214 in conjunction with the instructions in the memory 204 is configured to determine a traversal order for the at least one robot to visit the set of optimal viewpoints. As such, the traversal order generation module 214 is configured to determine a traversal cost between each pair of optimal viewpoints from the set of optimal viewpoints $v_x$ (i.e., $v_x = v_1$, $v_2$, $v_3$, $v_4$) based on a distance between the corresponding pair of optimal viewpoints. In an example, Euclidean distance between each pair of viewpoints of the set of viewpoints may be determined. For example, distance between viewpoints $v_1$ and $v_2$, $v_1$ and $v_3$, $v_1$ and $v_4$, $v_2$ and $v_3$, and so on. In general, a distance matrix D is generated indicating distance between every possible pair of optimal viewpoints. It shall be noted that kinematic constraints of the robot may also be factored in determining the distance between each pair of viewpoints.

The traversal order generation module 214 is further configured to identify the traversal order for the at least one robot using a path objective function. The path objective function is based on the traversal cost associated with each pair of optimal viewpoints and the priority cost associated with at least one optimal viewpoint of the pair of optimal viewpoints. In other words, the path objective function is based on the distance matrix D and the priority cost associated with at least one optimal viewpoint of each pair of optimal viewpoint (i.e., a source viewpoint and a destination viewpoint of the set of optimal viewpoints). More specifically, the priority cost of the destination viewpoint is used for solving the path objective function as shown below by Equation (6).

$$\text{Cost}_{route_j} = \text{pathLength}(v_i, v_j) * (1 - P_j) \quad \text{Equation (6)}$$

Where $v_i$ is the source viewpoint from the set of optimal viewpoints $v_j$ is the destination viewpoint from the set of optimal viewpoints $P_j$ is the priority cost associated with the destination viewpoint The path objective function provides a balance between the path length (i.e., distance between the source viewpoint and the destination viewpoint) and priority cost such that during determining an optimal traversal order, the combination of path length and the priority cost of the viewpoint are minimized. Accordingly, desirable viewpoints with more information that are also nearby get priority. In general, the path objective function is formulated as a traveling salesman problem which factors in priority cost of destination viewpoint. The addition of the priority cost associated with the destination optimal viewpoint ensures viewpoints which have more information are visited first by the at least one robot even if there is an optimal viewpoint with lesser information close by. More specifically, the path objective function is formulated with the priority function to maximize information gain before reaching a termination criterion. In one example scenario, the termination criterion for the at least one robot exploring a region would be to ensure all cells are covered. As exploration of all cells until all cells are covered may be expensive, time based termination is usually specified. For example, explore the region for 4 minutes and then manipulation of objects may be triggered. In another example scenario, the termination criterion specified may be to explore until a valid object is detected and trigger manipulation right after object detection. In such scenarios, collating maximum information related to objects from the set of optimal viewpoints is prioritized rather than covering the whole region. As such, the traversal order generation module 214 generates the traversal order for the set of optimal viewpoints such that the total cost of coverage path associated with the at least one robot is minimized. The traversal order of the set of optimal viewpoints is shared with the coverage path management module 216 and the at least one robot.

The coverage path management module 216 in conjunction with the instructions 205 in the memory 204 is configured to manage the path taken by the robot. More specifically, a smooth transition between a first viewpoint and a second viewpoint of the set of optimal viewpoints based on the traversal order is generated using a cubic Bezier curve. In general, these smooth paths are generated by fitting a cubic Bezier curve with control points tangent to each optimal viewpoint. The smooth transition between viewpoints enables the robot with non-holonomic constraints to approach the desired viewpoint (i.e., destination viewpoint) with proper alignment and reduces the need to perform in-place rotations that are time-consuming. In case the smooth path to the optimal destination viewpoint is blocked, a collision avoidance planner may be used to generate a collision-free path. As such, the coverage path management module 216 executes computation of the coverage path for the at least one robot to visit the set of optimal viewpoints factoring the kinematic constraints of the at least one robot which ensures the robot reaches the optimal destination viewpoint while staying close to the coverage path. Another advantage of this approach is that, during the smooth path generation process, the direction of the motion of the robot can be chosen based on the tangent direction. This allows the robot to approach the optimal destination viewpoint of the set of optimal viewpoints with the high-fidelity sensor facing toward the object of interest. Such an approach ensures early detection of objects.

In an embodiment, a control signal is generated by the at least one robot based on a quality of each observation of the one or more objects captured by the one or more sensors. More specifically, when the objects are captured with high precision and clarity even before reaching the destination optimal viewpoint from another optimal viewpoint, the at least one robot generates the control signal for the coverage path management module 216. Accordingly, the coverage path management module 216 initiates a replanning of the coverage path based on the control signal received from the at least one robot traversing between a pair of optimal viewpoints of the traversal order. As such, the coverage path management module 216 is configured to select a next optimal pose from the traversal order and update the coverage path for the at least one robot based on the next optimal pose in the traversal order. In general, as objects are detected early during the smooth transition between viewpoint, the robot may trigger replanning of the coverage path even before reaching the destination optimal viewpoint.

In general, smooth path transition is especially useful if the termination criterion is dependent not just on coverage but on valid detection of the object of interest which is possible when the at least one robot smoothly transitions with the high-fidelity sensor facing toward the object of interest. In the above example, it could help in the early detection of the object and hence early termination (as it detects the object ahead of time) and as such, the at least one robot switches to the next optimal viewpoint instead of going all the way to the destination optimal viewpoint. This helps in minimizing both the travel time and distance traversed by the at least one robot and increases the number of salient detections within a specified duration. An example of generating traversal order for the set of viewpoints and the coverage path taken by the at least one robot is shown and explained with reference to FIGS. 5A and 5B.

Figure 5A:
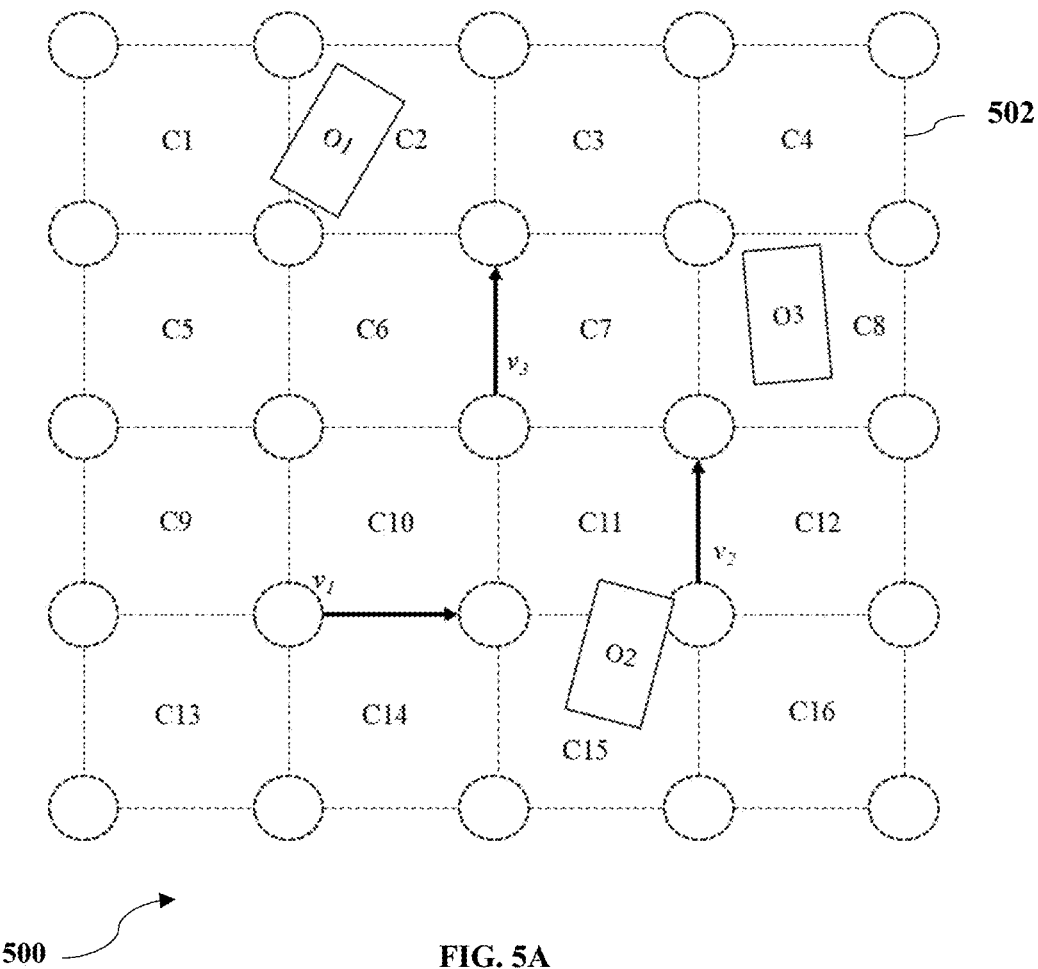
FIG. 5A illustrates an example schematic representation of a set of optimal viewpoints in a region, in accordance with an embodiment of the present disclosure.
Figure 5B:
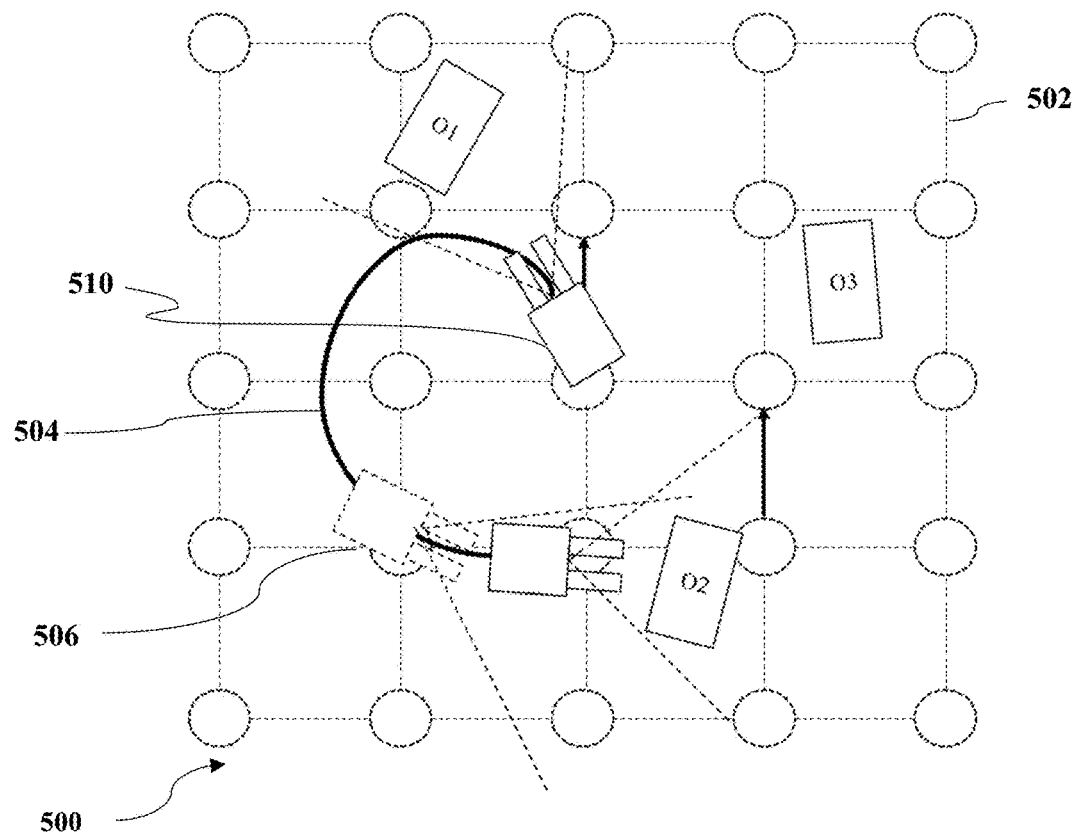
FIG. 5B illustrates a schematic representation of an autonomous mobile device traversing a coverage path based on a traversal order, in accordance with an embodiment of the present disclosure.

Referring now to FIGS. 5A and 5B, a schematic representation 500 of a region 502 depicting the set of optimal viewpoints $v_1$, $v_2$ and $v_3$ and a coverage path based on a traversal order of the set of optimal viewpoints $v_1$, $v_2$ and $v_3$, in accordance with an embodiment of the present disclosure. In this example representation 500, the set of optimal viewpoints $v_1$, $v_2$ and $v_3$ are identified using techniques described with reference to FIG. 2. Further, the traversal order of the set of optimal viewpoints is determined based on the path objective function which ensures viewpoints with maximum information gain are visited with precedence. As such, the traversal order for the robot 510 is $v_3$, $v_1$ and $v_2$.

As shown in FIG. 5B, the robot 510 captures data from the optimal viewpoint $v_3$ and then moves to optimal viewpoint $v_1$ based on the traversal order. The transition between the optimal viewpoints $v_3$ and $v_1$ is represented as a smooth curve 504. As the robot 510 transitions from the viewpoint $v_3$ to $v_1$, a high-fidelity sensor (not shown in FIGS. 5A and 5B) of the robot 510 is aligned to face an object of interest $O_2$ during the transition and even before reaching the viewpoint $v_1$. As evident from FIG. 5B, the robot 510 captures data of the object $O_2$ at a location 506 during the smooth transition prior to reaching the viewpoint $v_1$ for capturing data of the same object $O_2$. Such early detection of objects, helps with early termination (as it detects the object ahead of time) and as such, the at least one robot initiates replanning of the coverage path thereby minimizing a distance traversed and time taken to visit all optimal viewpoints. These detections of objects will be used for manipulating objects as will be explained hereinafter.

Referring now to FIG. 2, the object manipulation module 218 in conjunction with the instructions in the memory 204 is configured to determine a pickup order for moving each object of the one or more objects from a source location to a destination location in the region. Accordingly, the object manipulation module 218 is configured to determine obstruction constraints in relation to each object of the one or more objects. In one example, data from the robot traversing the coverage path may indicate that object O3 may be moved only after object O1 is moved. As such, the object manipulation module 218 is configured to receive a plurality of object characteristics of each object of the one or more objects in the region from the data processing module 210. As already explained, the robot traverses the coverage path and during traversal, the robot captures data related to the objects and sends the data to the data processing module 210 via the communication interface 208. The data processing module 210 is configured to determine the object characteristics based on processing the data.

In an embodiment, obstruction constraints in relation to each object of the one or more objects is determined based on the plurality of object characteristics of each object. In an example, dimensions of an object and location/position of the object as determined from the data may be used to determine the obstruction constraints. An example of determining obstruction constraints is explained with reference to FIG. 6.

Figure 6:
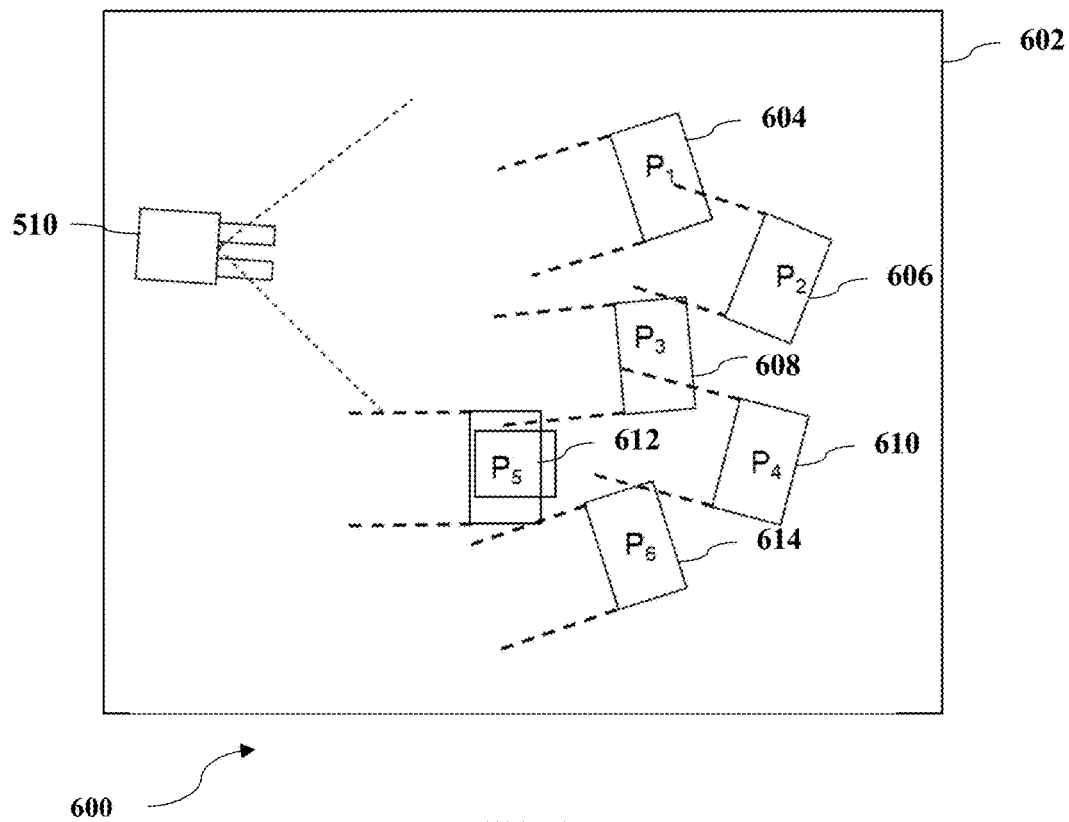
FIG. 6 illustrates a schematic representation of a plurality of objects arranged in a region depicting obstruction constraints by other objects, in accordance with an embodiment of the present disclosure.

Referring now to FIG. 6, a schematic representation 600 of objects 604, 606, 608, 610, 612, 614 arranged in a region 602 depicting obstruction by other objects is illustrated in accordance with an example embodiment of the present disclosure. As already explained, the robot explores the region based on the traversal order of the set of optimal viewpoints. During exploration, the robot identifies the objects 604, 606, 608, 610, 612, 614 and collates object characteristics of each of the objects 604, 606, 608, 610, 612, 614. More specifically, the robots collate data related to their position, orientation, location, dimensions, and the like for manipulation. In an example scenario, these objects are blocked/obstructed by other objects and hence can't be manipulated around. As shown in the FIG. 6, a list of objects along with the object they are constrained on is generated and shown in Table 1.

TABLE 1

| Object | Constraints |
|---|---|
| P1 |  |
| P2 | P1, P3 |
| P3 | P5 |
| P4 | P3, P6 |
| P5 |  |
| P6 | P5 |

As evident from FIG. 6, objects P1 and P5 are not obstructed by any objects. However, object P2 is obstructed by P1 and P3, object P3 is obstructed by object P5, and so on. In order for the robot to move the object P2, the robot has to move objects P1 and P3 and in order to move the object P3, object P5 needs to be moved. As such, the object manipulation module 218 is configured to reduce the Table 1 based on the obstruction constraints of each object. For example, if object P2 is constrained on object P3 and object P3 is constrained on object P5, then the reduced constrained would include all the sub constraints, in this case, object P2 would be constrained on objects P3 and P5. Such a reduced obstruction constraint table for the representation 600 is shown in Table 2.

TABLE 2

| Payload | Constraints |
|---|---|
| P1 |  |
| P2 | P1, P3, P5 |
| P3 | P5 |
| P4 | P3, P5, P6 |
| P5 |  |
| P6 | P5 |

As such, the object manipulation module 218 determines these obstruction constraints and shares it with the robot dynamically for manipulating objects 604, 606, 608, 610, 612, 614. More specifically, the object manipulation module 218 determines the pickup order of objects in the region based on the obstruction constraints. For example, the pickup order for the robot starts with objects that have no constraints. In this example representation, object P1 or P5 may be moved first as they have no constraints and may appear first in the pick-up order. In such cases, more than one object has no obstruction constraints, a heuristic may be used to optimize the pick-up order. In one example, object that is closer to the robot may appear first in the pick-up order and the other object is listed thereafter.

Referring now to FIG. 2, the object manipulation module 218 is configured to reevaluate obstruction constraints after the at least one robot moves each object of the one or more objects from the source location to the destination location. More specifically, pick up order may change after an object is moved i.e, obstruction constraints may change dynamically based on the movement of one object. As such, obstruction constraints are reevaluated after the object with higher precedence is moved away. In the above example representation of Table 2, after objects P1 and P5 are moved, objects P2 and P3 have no constraints and either P2 or P3 may be moved which is determined based on the reevaluation. Accordingly, the pickup order for the at least one robot is updated based on the reevaluated obstruction constraints. An example of the pick up order of objects 604, 606, 608, 610, 612, 614 based on obstruction constraints reevaluated after every object is moved may be as follows: P1→P5→P3→P6→P2→P4. It shall be noted the pick up order for the representation 600 is shown for exemplary purposes only and the pick up order may factor in other constraints, such as, distance between objects, distance between the robot and object to be moved, complexity in moving a object, and the like.

It shall be noted that although the system 150 is explained with reference to warehouse environment, various embodiments of the present disclosure may also be used in search and rescue missions, commercial or industrial infrastructures for collating objects in a shopping list, monitoring unstructured parking lot, and the like, without departing from the scope of the present disclosure. Moreover, embodiments of the present disclosure may be extended for multiple robots deployed simultaneously for coverage path planning based on an assigned task. A method for generating an optimized coverage path for autonomous mobile devices is explained next with reference to FIG. 7.

Figure 7:
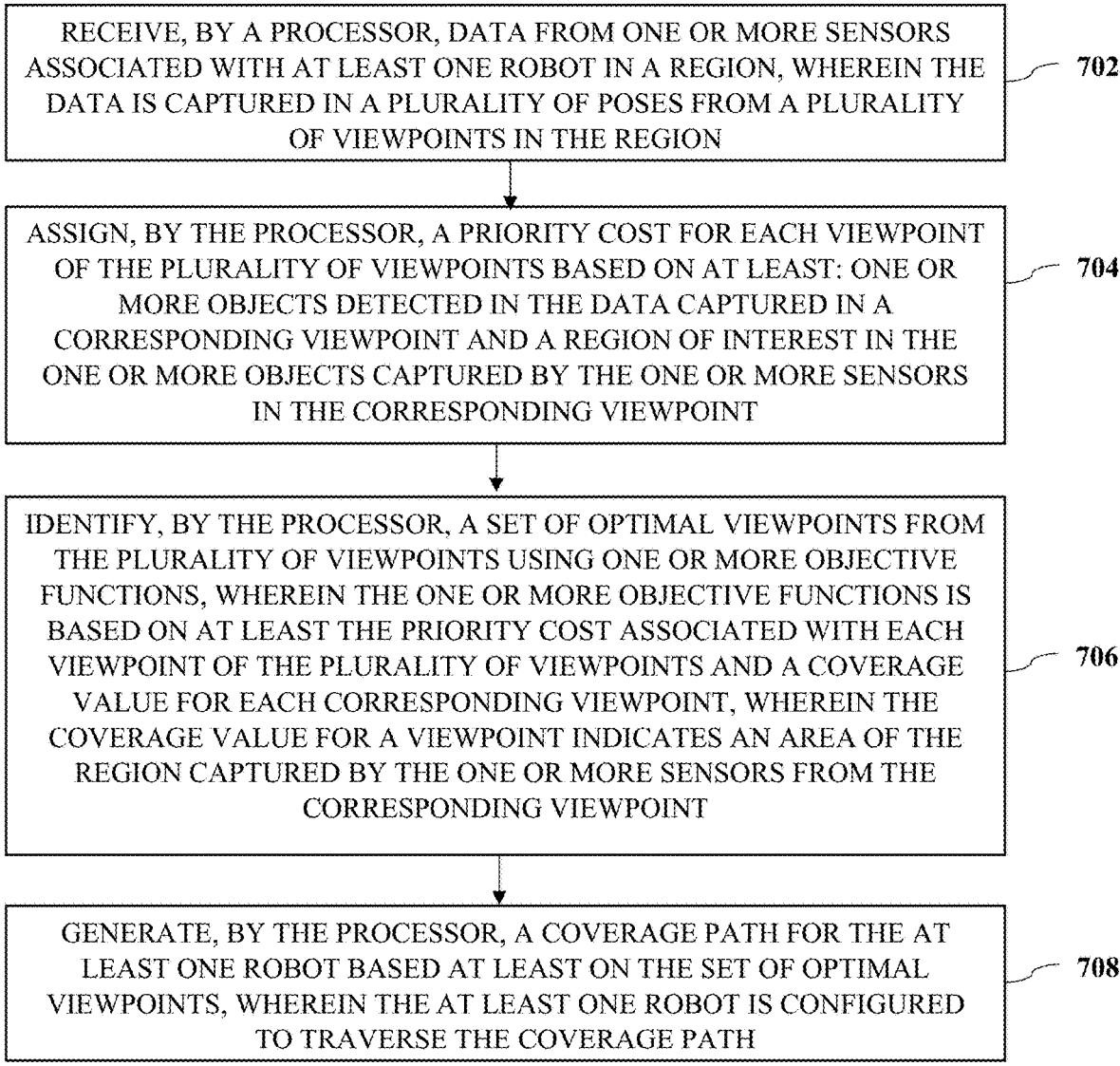
FIG. 7 is a flowchart illustrating a method for optimizing coverage path of autonomous mobile devices, in accordance with an embodiment of the present disclosure.

FIG. 7 is a flowchart illustrating a method 700 for optimizing a coverage path of a robot, in accordance with an embodiment of the present disclosure. The method 700 depicted in the flow diagram may be executed by, for example, the system 150. Operations of the flow diagram, and combinations of operation in the flow diagram, may be implemented by, for example, hardware, firmware, a processor, circuitry and/or a different device associated with the execution of software that includes one or more computer program instructions. The operations of the method 700 are described herein with help of the system 150. It is noted that the operations of the method 700 can be described and/or practiced by using one or more processors of a system/device other than the system 150, such as a processor embodied within the robots. The method 700 starts at operation 702

At operation 702 of the method 700, data from one or more sensors associated with at least one robot in a region is received by a processor. For example, the processor 202 embodied within a system such as, the system 150 shown and explained with reference to FIG. 2. As already explained, the data is captured in a plurality of poses from a plurality of viewpoints in the region. The system 150 may be embodied within a centralized server controlling operations of the environment, for example, warehouse, or in a decentralized manner may be integrated within a robot exploring the region. The data includes at least one of: radar images, RGB images, lidar images, and infrared images.

At operation 704 of the method 700, a priority cost is assigned for each viewpoint of the plurality of viewpoints based on at least: one or more objects detected in the data captured in a corresponding viewpoint and a region of interest in the one or more objects captured by the one or more sensors in the corresponding viewpoint. The region of interest in the one or more objects captured by the one or more sensors corresponds to at least one of: a length of each object of the one or more objects, a width of each object of the one or more objects, a breadth of each object of the one or more objects, an area of each object of the one or more objects and volume of each object of the one or more objects. The priority cost for a viewpoint is determined based on Equations (1), (2) and (3) as explained with reference to FIG. 2, 4A-4B.

At operation 706 of the method 700, a set of optimal viewpoints are identified from the plurality of viewpoints using one or more objective functions. The one or more objective functions is based on at least the priority cost associated with each viewpoint of the plurality of viewpoints and a coverage value for each corresponding viewpoint. An example of the one or more objective functions is shown by Equations (4) and (5). The coverage value for a viewpoint indicates an area of the region captured by the one or more sensors from the corresponding viewpoint. Identifying the set of optimal viewpoints based on the one or more objective functions is explained with reference to FIG. 2 and is not explained herein for the sake of brevity.

At operation 708 of the method 700, a coverage path for the at least one robot is generated based at least on the set of optimal viewpoints. As such, a traversal order of the set of optimal viewpoints is determined using a path objective function that minimizes path length/distance traversed whilst ensuring optimal viewpoints with maximum information are visited with precedence. Thereafter, smooth path transition of the at least one robot between optimal viewpoints is ensured using cubic Beizer curves and the at least one robot is configured to traverse the coverage path The sequence of operations of the method 700 need not be necessarily executed in the same order as they are presented. Further, one or more operations may be grouped together and performed in form of a single step, or one operation may have several sub-steps that may be performed in parallel or in sequential manner.

The disclosed methods with reference to FIGS. 1 to 7, or one or more operations of the flow diagram 700 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer.

Figure 8:
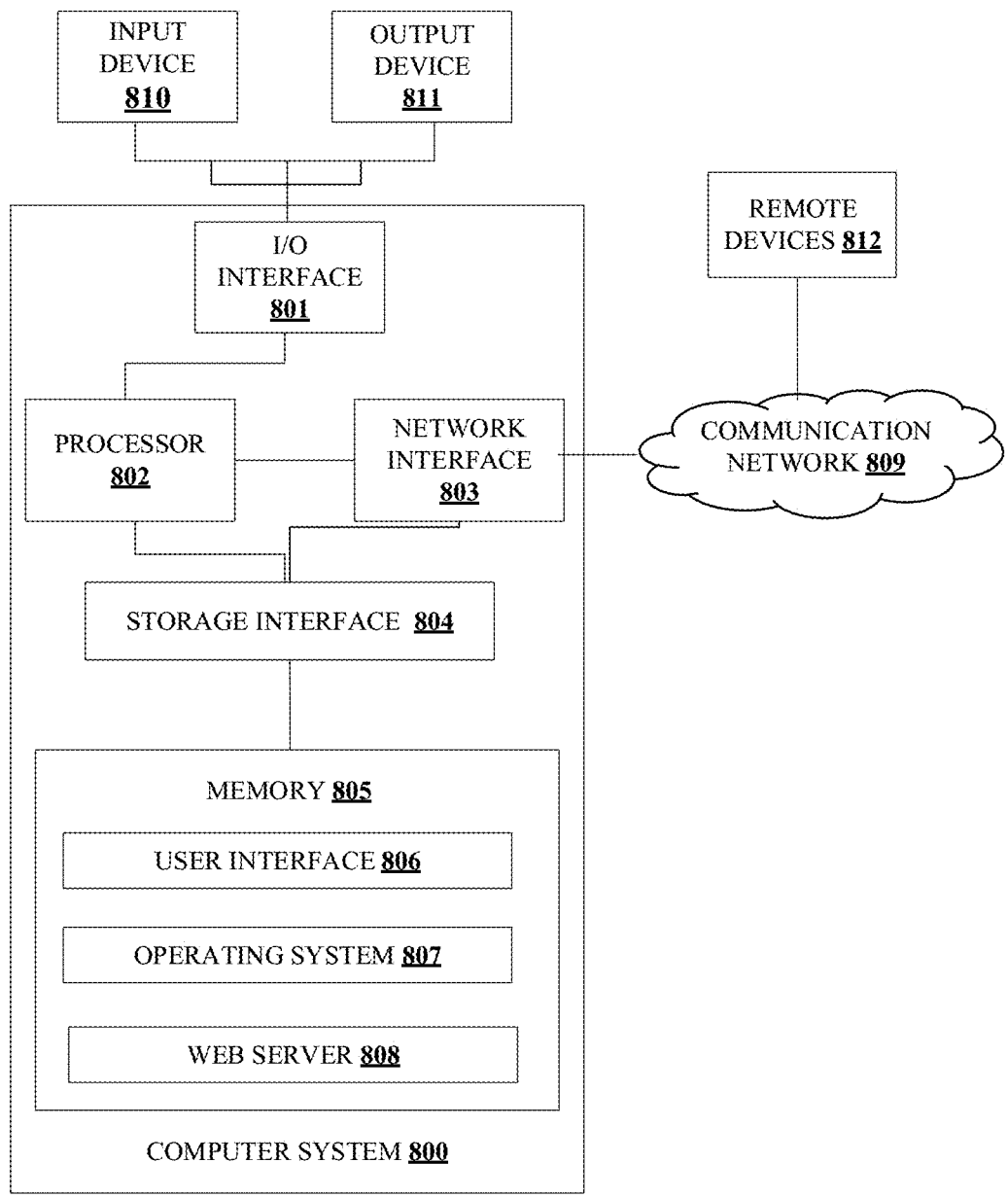
FIG. 8 shows a block diagram of a general-purpose computer for optimizing a coverage path of an autonomous mobile devices, in accordance with an embodiment of the present disclosure.

FIG. 8 shows a block diagram of a general-purpose computer for optimizing coverage path of autonomous mobile devices, in accordance with an embodiment of the present disclosure. The computer system 800 may comprise a central processing unit ("CPU" or "processor") 802. The processor 802 may comprise at least one data processor. The processor 802 may include specialized processing units such as integrated system (bus) controllers, memory management control units, floating point units, graphics processing units, digital signal processing units, etc. The computer system 800 may be analogous to the system 150 (shown in FIG. 2).

The processor 802 may be disposed in communication with one or more input/output (I/O) devices (not shown) via I/O interface 801. The I/O interface 801 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), Radio Frequency (RF) antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 801, the computer system 800 may communicate with one or more I/O devices. For example, the input device 810 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device 811 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 800 is connected to the remote devices 812 through a communication network 809. The remote devices 812 may be peripheral devices data received from robots. The processor 802 may be disposed in communication with the communication network 809 via a network interface 803. The network interface 803 may communicate with the communication network 809. The network interface 803 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 809 may include, without limitation, a direct interconnection, local area network (LAN), wide area network (WAN), wireless network (e.g., using Wireless Application Protocol), the Internet, etc. Using the network interface 803 and the communication network 809, the computer system 800 may communicate with the remote devices 812. The network interface 803 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 809 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi, 3GPP and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 802 may be disposed in communication with a memory 805 (e.g., RAM, ROM, etc. not shown in FIG. 8) via a storage interface 804. The storage interface 804 may connect to memory 805 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 805 may store a collection of program or database components, including, without limitation, user interface 806, an operating system 807, web server 808, etc. In some embodiments, computer system 800 may store user/application data, such as, the data, variables, records, etc., as described in this disclosure. Such databases may be implemented as fault-tolerant, relational, scalable, secure databases such as Oracle® or Sybase®.

The operating system 807 may facilitate resource management and operation of the computer system 800. Examples of operating systems include, without limitation, APPLE MACINTOSH® OS X, UNIX®, UNIX-like system distributions (e.g., BERKELEY SOFTWARE DISTRIBUTION™ (BSD), FREEBSD™, NETBSD™, OPENBSD™, etc.), LINUX DISTRIBUTIONS™ (e.g., RED HAT™, UBUNTU™, KUBUNTU™, etc.), IBM™ OS/2, MICROSOFT™ WINDOWS™ (XP™ VISTA™/7/8, 10 etc.), APPLE® IOS™ GOOGLE® ANDROID™, BLACKBERRY® OS, or the like.

In some embodiments, the computer system 800 may implement a web browser 808 stored program component. The web browser 808 may be a hypertext viewing application, for example MICROSOFT® INTERNET EXPLORER™, GOOGLE® CHROME™, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers 808 may utilize facilities such as AJAX™ DHTML™, ADOBER FLASH™, JAVASCRIPT™, JAVA™, Application Programming Interfaces (APIs), etc. In some embodiments, the computer system 800 may implement a mail server stored program component. The mail server may be an Internet mail server such as Microsoft Exchange, or the like. The mail server may utilize facilities such as ASP™ ACTIVEX™, ANSI™ C++/C#, MICROSOFT®, .NET™, CGI SCRIPTS™, JAVA™ JAVASCRIPT™, PERL™, PHP™ PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 800 may implement a mail client stored program component. The mail client may be a mail viewing application, such as APPLE® MAIL™, MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD (Compact Disc) ROMs, DVDs, flash drives, disks, and any other known physical storage media.

Various embodiments of the present disclosure provide numerous advantages. Embodiments of the present disclosure provide an optimized method for coverage path planning of autonomous mobile devices. The assignment of priority costs for each viewpoint based on objects detected and regions of interest in the detected objects ensures viewpoints with maximum information are accorded precedence. Further, determining optimal set of viewpoints based on the priority cost associated with each viewpoint ensures viewpoints with maximum information are selected as optimal viewpoints. In addition, integration of the priority cost for determining the traversal order of the set of optimal viewpoints ensures viewpoints with maximum information that are also nearby get priority such that the combination of path length and the priority cost of the viewpoint are minimized. More specifically, the path objective function is formulated with the priority function to maximize information gain before reaching a termination criterion. Moreover, coverage paths generated as smooth path transition ensures early detection of objects and hence early termination thereby, minimizing both the travel time and distance traversed by the at least one robot and increases the number of salient detections within a specified duration.

It will be understood by those within the art that, in general, terms used herein, and are generally intended as "open" terms (e.g., the term "including" should be interpreted as "including but not limited to," the term "having" should be interpreted as "having at least," the term "includes" should be interpreted as "includes but is not limited to," etc.). For example, as an aid to understanding, the detail description may contain usage of the introductory phrases "at least one" and "one or more" to introduce recitations. However, the use of such phrases should not be construed to imply that the introduction of a recitation by the indefinite articles "a" or "an" limits any particular part of description containing such introduced recitation to inventions containing only one such recitation, even when the introductory phrases "one or more" or "at least one" and indefinite articles such as "a" or "an" (e.g., "a" and/or "an" should typically be interpreted to mean "at least one" or "one or more") are included in the recitations; the same holds true for the use of definite articles used to introduce such recitations. In addition, even if a specific part of the introduced description recitation is explicitly recited, those skilled in the art will recognize that such recitation should typically be interpreted to mean at least the recited number (e.g., the bare recitation of "two recitations," without other modifiers, typically means at least two recitations or two or more recitations).

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following detailed description

We claim:

1. A method for optimizing coverage path, the method comprising:
   receiving, by a processor, data from one or more sensors associated with at least one robot in a region, wherein the data is captured in a plurality of poses from a plurality of viewpoints in the region;
   assigning, by the processor, a priority cost for each viewpoint of the plurality of viewpoints based on at least: one or more objects detected in the data captured in a corresponding pose and a region of interest in the one or more objects captured by the one or more sensors in the corresponding viewpoint;
   identifying, by the processor, a set of optimal viewpoints that maximizes information gain about the one or more objects in a surrounding region of the at least one robot from the plurality of viewpoints using one or more objective functions, wherein the one or more objective functions is based on at least the priority cost associated with each viewpoint of the plurality of viewpoints and a coverage value for each corresponding viewpoint, wherein the coverage value for a viewpoint indicates an area of the region captured by the one or more sensors from the corresponding viewpoint;

generating, by the processor, a coverage path comprising a traversal order for the at least one robot based at least on the set of optimal viewpoints and a pre-defined termination criteria, wherein the traversal order is determined using a path objective function based on a distance between each pair of the set of optimal viewpoints and the priority cost associated with a destination viewpoint of the corresponding pair of the set of optimal viewpoints; and traversing, by the at least one robot, the coverage path such that viewpoints among the set of optimal viewpoints with maximum information gain are traversed first.

2. The method as claimed in claim 1, wherein the data comprises at least one of: radar images, RGB images, lidar images, and infrared images.

3. The method as claimed in claim 1, wherein the region of interest in the one or more objects captured by the one or more sensors corresponds to at least one of: a length of each object of the one or more objects, a width of each object of the one or more objects, a breadth of each object of the one or more objects, an area of each object of the one or more objects and volume of each object of the one or more objects.

4. The method as claimed in claim 1, wherein the coverage value for a viewpoint comprises cell indices of one or more cells of a plurality of cells in the region, determined by ray tracing a field of view of the one or more sensors from the corresponding viewpoint on a grid.

5. The method as claimed in claim 4, wherein the one or more objective functions is further associated with a visibility matrix and at least one threshold value, and wherein the visibility matrix is constructed based on the coverage value associated with each viewpoint of the plurality of viewpoints.

6. The method as claimed in claim 1, wherein the termination criteria comprising at least one of (a) expiration of a predefined time duration, or (b) detection of a valid object of interest by the one or more sensors of the at least one robot.

7. The method as claimed in claim 1, wherein determining the traversal order comprises:
determining, by the processor, a traversal cost between each pair of optimal viewpoints from the set of optimal viewpoints based on a distance between the corresponding pair of optimal viewpoints; and
identifying, by the processor, the traversal order for the at least one robot using the path objective function.

8. The method as claimed in claim 7, further comprising:
generating a smooth transition between a first viewpoint and a second viewpoint of the set of optimal viewpoints based on the traversal order using a cubic Bezier curve.

9. The method as claimed in claim 1, further comprising:
initiating, by the processor, a replanning of the coverage path based on a control signal received from the at least one robot traversing between a pair of optimal viewpoints of the traversal order,
wherein the control signal is generated by the at least one robot based on a quality of each observation of the one or more objects captured by the one or more sensors,
wherein the replanning comprises selecting a next optimal pose from the traversal order; and
updating, by the processor, the coverage path for the at least one robot based on the next optimal pose in the traversal order.

10. The method as claimed in claim 1, further comprising:
receiving, by the processor, a plurality of object characteristics of each object of the one or more objects in the region from the at least one robot on traversing the coverage path;
determining, by the processor, obstruction constraints in relation to each object of the one or more objects based on the plurality of object characteristics of each object; and
generating, by the processor, a pickup order for moving each object of the one or more objects from a source location to a destination location in the region based on the obstruction constraints.

11. The method as claimed in claim 10, further comprising:
reevaluating, by the processor, obstruction constraints after the at least one robot moves each object of the one or more objects from the source location to the destination location; and
updating, by the processor, the pickup order for the at least one robot based on the reevaluated obstruction constraints.

12. A system for optimizing coverage path, the system comprising:
a memory configured to store instructions; and
a processor configured to execute the instructions stored in the memory and thereby cause the system to:
receiving, by a processor, data from one or more sensors associated with at least one robot in a region, wherein the data is captured in a plurality of poses from a plurality of viewpoints in the region;
assigning, by the processor, a priority cost for each viewpoint of the plurality of viewpoints based on at least: one or more objects detected in the data captured in a corresponding pose and a region of interest in the one or more objects captured by the one or more sensors in the corresponding viewpoint;
identifying, by the processor, a set of optimal viewpoints that maximizes information gain about the one or more objects in a surrounding region of the at least one robot from the plurality of viewpoints using one or more objective functions, wherein the one or more objective functions is based on at least the priority cost associated with each viewpoint of the plurality of viewpoints and a coverage value for each corresponding viewpoint, wherein the coverage value for a viewpoint indicates an area of the region captured by the one or more sensors from the corresponding viewpoint;
generating, by the processor, a coverage path comprising a traversal order for the at least one robot based at least on the set of optimal viewpoints and a pre-defined termination criteria, wherein the traversal order is determined using a path objective function based on a distance between each pair of the set of optimal viewpoints and the priority cost associated with a destination viewpoint of the corresponding pair of the set of optimal viewpoints; and
traversing, by the at least one robot, the coverage path such that viewpoints among the set of optimal viewpoints with maximum information gain are traversed first.

13. The system as claimed in claim 12, wherein the data comprises at least one of: radar images, RGB images, lidar images, infrared images.

14. The system as claimed in claim 12, wherein the region of interest in the one or more objects captured by the one or more sensors corresponds to at least one of: a length of each object of the one or more objects, a width of each object of the one or more objects, a breadth of each object of the one or more objects, an area of each object of the one or more objects and volume of each object of the one or more objects.

15. The system as claimed in claim 12, wherein the coverage value for a viewpoint comprises cell indices of one or more cells of a plurality of cells in the region, determined by ray tracing a field of view of the one or more sensors from the corresponding viewpoint on a grid.

16. The system as claimed in claim 15, wherein the one or more objective functions is further associated with a visibility matrix and at least one threshold value, and
wherein the visibility matrix is constructed based on the coverage value associated with each viewpoint of the plurality of viewpoints.

17. The system as claimed in claim 12, wherein for generating the coverage path for the at least one robot determining the traversal order, the system is further caused to:
determine a traversal cost between each pair of optimal viewpoints from the set of optimal viewpoints based on a distance between the corresponding pair of optimal viewpoints; and
identify a traversal order for the at least one robot using the path objective function.

18. The system as claimed in claim 17, wherein the system is further caused to:
generate a smooth transition between a first viewpoint and a second viewpoint of the set of optimal viewpoints based on the traversal order using a cubic Bezier curve.

19. The system as claimed in claim 12, wherein the system is further caused to:
initiate a replanning of the coverage path based on a control signal received from the at least one robot traversing between a pair of optimal viewpoints of the traversal order,
wherein the control signal is generated by the at least one robot based on a quality of each observation of the one or more objects captured by the one or more sensors,
wherein the replanning comprises selecting a next optimal pose from the traversal order; and
update the coverage path for the at least one robot based on the next optimal pose in the traversal order.

20. A non-transitory computer-readable medium storing instructions for optimal coverage path planning, the instructions when executed by a processor cause a system to perform a method comprising:
receiving data from one or more sensors associated with at least one robot in a region, wherein the data is captured in a plurality of poses from a plurality of viewpoints in the region;
assigning a priority cost for each viewpoint of the plurality of viewpoints based on at least: one or more objects detected in the data captured in a corresponding pose and a region of interest in the one or more objects captured by the one or more sensors in the corresponding pose;
identifying, by the processor, a set of optimal viewpoints that maximizes information gain about the one or more objects in a surrounding region of the at least one robot from the plurality of viewpoints using one or more objective functions, wherein the one or more objective functions is based on at least the priority cost associated with each viewpoint of the plurality of viewpoints and a coverage value for each corresponding viewpoint, wherein the coverage value for a viewpoint indicates an area of the region captured by the one or more sensors from the corresponding viewpoint;
generating, by the processor, a coverage path comprising a traversal order for the at least one robot based on at least on the set of optimal viewpoints and a pre-defined termination criteria, wherein the traversal order is determined using a path objective function based on a distance between each pair of the set of optimal viewpoints and the priority cost associated with a destination viewpoint of the corresponding pair of the set of optimal viewpoints; and
traversing by the at least one robot, the coverage path such that viewpoints among the set of optimal viewpoints with maximum information gain are traversed first.

* * * * *